(12) United States Patent
Nakasuji

(10) Patent No.: US 6,565,633 B1
(45) Date of Patent: May 20, 2003

(54) ELECTRON BEAM TREATMENT APPARATUS OF FLUE GAS AND BOILER SYSTEM WITH THE SAME APPARATUS

(75) Inventor: Mamoru Nakasuji, 2-15-11, Serigaya-chou, Kounan-ku, Yokohama-shi, Kanagawa-ken (JP), 233-0006

(73) Assignee: Mamoru Nakasuji, Yokohama (JP)

( * ) Notice: Subject to any disclaimer, the term of this patent is extended or adjusted under 35 U.S.C. 154(b) by 0 days.

(21) Appl. No.: 09/790,452

(22) Filed: Feb. 23, 2001

(30) Foreign Application Priority Data

Feb. 29, 2000 (JP) .................................... 2000-102819

(51) Int. Cl.[7] ............................................ B03C 3/016
(52) U.S. Cl. ................................. 96/15; 96/16; 422/121
(58) Field of Search ................................. 96/15, 16, 60, 96/61, 62, 74, 75; 422/121; 95/58, 78

(56) References Cited

U.S. PATENT DOCUMENTS

| | | | | |
|---|---|---|---|---|
| 3,585,060 A | * | 6/1971 | Gourdine et al. | 95/58 X |
| 4,046,527 A | * | 9/1977 | Kistemaker | 96/74 X |
| 4,090,856 A | * | 5/1978 | Rogoff | 96/74 X |
| 4,203,948 A | * | 5/1980 | Brundbjerg | 422/121 |
| 4,472,174 A | * | 9/1984 | Chuan | 95/58 |
| 4,750,917 A | * | 6/1988 | Fujii | 422/24 X |
| 4,876,852 A | * | 10/1989 | Abthoff et al. | 96/16 X |
| 5,060,805 A | * | 10/1991 | Fujii et al. | 96/16 X |
| 5,154,733 A | * | 10/1992 | Fujii et al. | 422/24 X |
| 5,225,000 A | * | 7/1993 | Fujii et al. | 422/24 X |
| 5,288,305 A | * | 2/1994 | Gellert et al. | 96/16 X |
| 5,492,557 A | * | 2/1996 | Vanella | 96/62 X |
| 5,837,035 A | * | 11/1998 | Braun et al. | 95/78 |

FOREIGN PATENT DOCUMENTS

JP 8-166497 * 6/1996

* cited by examiner

Primary Examiner—Richard L. Chiesa

(57) ABSTRACT

The electron beam is irradiated from the center part to the outer direction in the irradiation duct. Then required electron range is decreased and the required beam energy is decreased. The electron beam introduction window is formed as a thin curved surface and made of Al alloy or SiC ceramics, then the energy absorption is decreased, a large beam current is available and X-ray shield become very small sized and very simple. By dividing the acceleration voltage into a positive and negative voltage, the absolute value of the applied voltage is decreased, then the reliability for the insulator is increased and the acceleration voltage can be obtained without mechanical movement.

20 Claims, 3 Drawing Sheets

ELECTRON BEAM TREATMENT APPARATUS OF FLUE GAS AND BOILER SYSTEM WITH THE SAME APPARATUS

FIELD OF THE INVENTION

This invention pertains to a apparatus, which remove a sulfur dioxide and a nitrogen oxide, which are generated by combustion of coal or oil. This invention also relates to a boiler system with such a apparatus.

BACKGROUND OF THE INVENTION

There has been used a boiler system in which a dust in a flue gas is removed by an electrostatic precipitator, the flue gas is cooled through a cooler tower, in a irradiation duct an electron beam is irradiated normal direction to the gas flow, and an ammonium is supplied. Then a mixture of an ammonium sulfate and an ammonium nitride is produced. As a results the flue gas is cleaned. These systems are disclosed in a Japanese patent application: H8-16433.

In the prior arts the electron beam with a 800 keV of beam energy is irradiated normal direction to the flue gas flow. As a scattering cross section between the electron beam with 800 keV of beam energy and the flue gas is small, the flue gas that flow irradiation window side is not absorb sufficiently the electron energy and then pass through the irradiation duct. The scattering cross section between the electron and the flue gas is large, only at the anti-window side, as the electron beam have lost its initial energy through the passage into the flue gas. Therefore, only in the flue gas, which pass through the anti-window side, sulfur dioxide and nitride oxide is removed sufficiently.

For the conventional apparatus, the electron beam with high energy irradiate metal parts and high intensity X-ray is generated. Therefore a close X-ray shield is necessary and most of the electron energy is not used for the reaction. It is also problem that a high voltage power source and an insulator are very expensive and unreliable. It is also other problem that when the beam current is increased, the irradiation entrance window become very hot.

SUMMARY OF THE INVENTION

It is a purpose of the invention to provide a charged particle beam treatment apparatus, in which adverse effect of the small collision cross-section between flue gas and the electron beam, a high temperature window, and too high acceleration voltage are improved. The apparatus is also suitable for obtaining a low cost apparatus with improved de-sulfate and de-nitride. It is also the purpose of this invention to offer a boiler system which emit flue gas with a little sulfur dioxide and nitride oxide.

The electron beam treatment apparatus of the first embodiment of this invention comprises: an irradiation duct, introduction entrances for the electron beam and an ammonium, wherein an electric field that deflect the electron beam is introduced into the irradiation duct.

The electron beam treatment apparatus of the second embodiment of this invention comprises: an electron source, an irradiation duct, a window for the electron beam inlet, and an ammonium introduction entrance, wherein said window is made of SiC ceramics or an aluminum alloy film with a non-corrosion coating.

The electron beam treatment apparatus of the third embodiment of this invention comprises: an electron source, an irradiation duct, an introduction entrance for the electron beam inlet, and an ammonium introduction entrance, wherein said electron beam source have a cathode, a convergent electrode, and form a crossover at the electron beam introduction entrance.

DETAILED DESCRIPTION OF A PREFERRED EMBODIMENT

Figure 1:
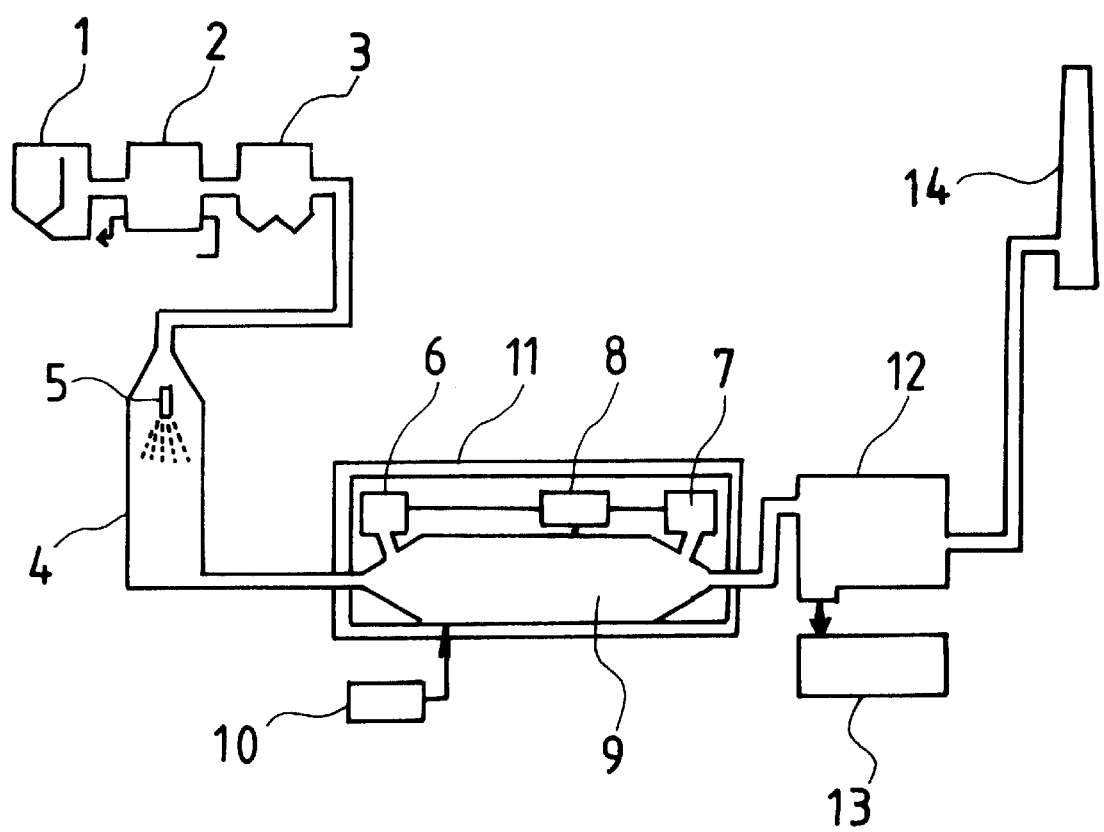
FIG. 1 is a boiler system in this invention.

The following are explanation with the drawing being refereed to. FIG. 1 is the block diagram for a boiler system in the first embodiment of this invention. The flue gas emitted from the boiler 1 is removed a residual thermal energy through the heat exchanger 2, pass through the electrostatic precipitator 3, cooled down to around 60° C. by cooling water 5 through the cooling tower 4, and enters into the irradiation duct 9. The inlet and outlet part of the irradiation duct have a taper that the cross section of the duct is increasing and decreasing, respectively. The electron beam entrance is deposited at the inlet or outlet part of the irradiation duct. An ammonium supply device 10 is deposited to the irradiation duct. The flue gas coming from the irradiation duct is removed a ammonium sulfate and an ammonium nitrate which is generated in the irradiation duct, by a dry type electrostatic precipitator to a receptacle 13, and then the flue gas is lead to a chimney.

Figure 2:
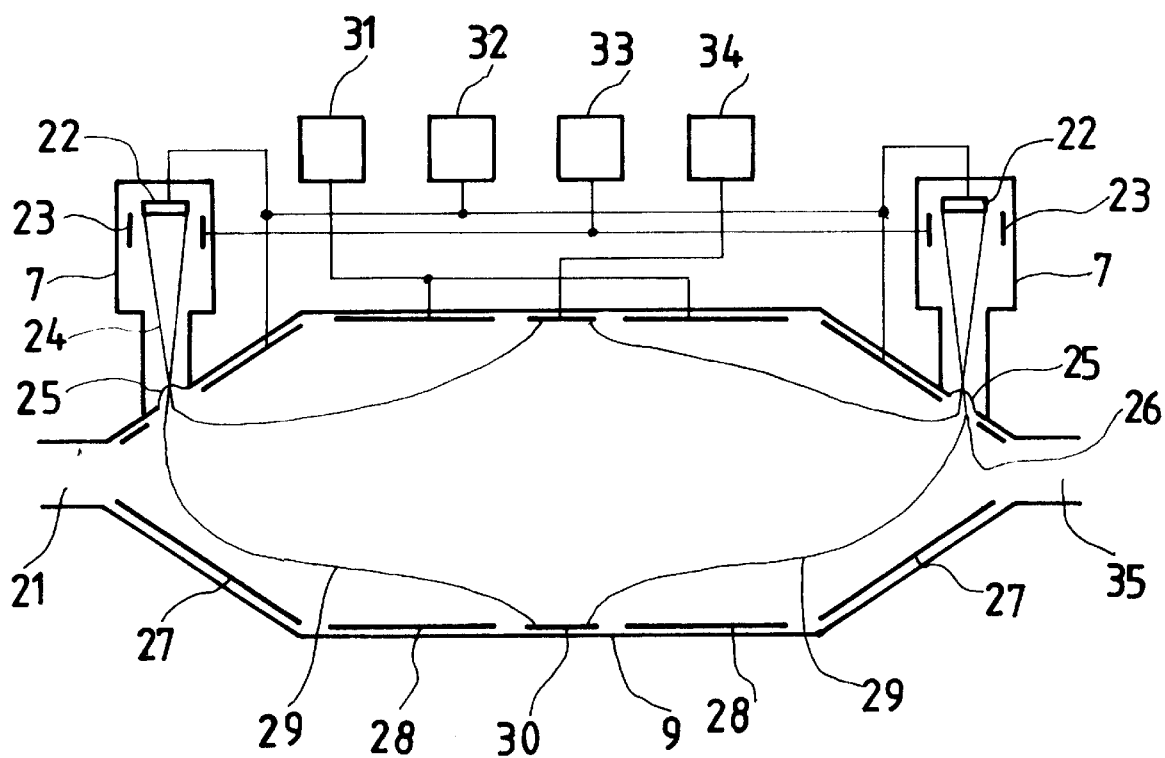
FIG. 2 is a detailed drawing for irradiation duct of this invention.

FIG. 2 is a detailed drawing for irradiation duct of the first embodiment of this invention. The entrance 21 and the outlet 35 of the irradiation duct have small diameter and a large diameter at the center part 9, then the flue gas flow slowly at the center part. At the entrance and the outlet parts of the irradiation duct, the electron beam entrances are designed. Not to irradiate the electron beam to the duct wall, a cone shape electrode 27 which have potential of a little higher potential than the cathode potential is applied. It is also good that the cathode and the electrode 27 are supplied a same potential by power source 32 as shown in FIG. 2. An electric field that drift the electron beam to the flue gas direction is formed by this cone shape electrode 27, even if the electron beam is introduced to any direction. Typical electron beam envelopes 29 are shown in FIG. 2. The electron beam loss energy little by little through the collision to the gas molecule, drift to the radial direction of the irradiation duct and finally absorbed by the electrode 30, which have a potential of 100 kV.

In the irradiation duct, there are another electrode 28 which have around 50 kV potential that does not obstruct the electron diffuse to large radius but little electron is absorbed by this electrode. The electrodes 28 are supplied by a power source 31. This potential value is optimized through a Monte Carlo simulation for a collision phenomenon between the electron and the flue gas. If too lower potential is applied to this electrode, the electrons are collected to the center part of the irradiation duct, and if too high potential is applied to the electrode, much electron irradiate to the electrode with high energy and wastefully generate X-ray.

Figure 3:
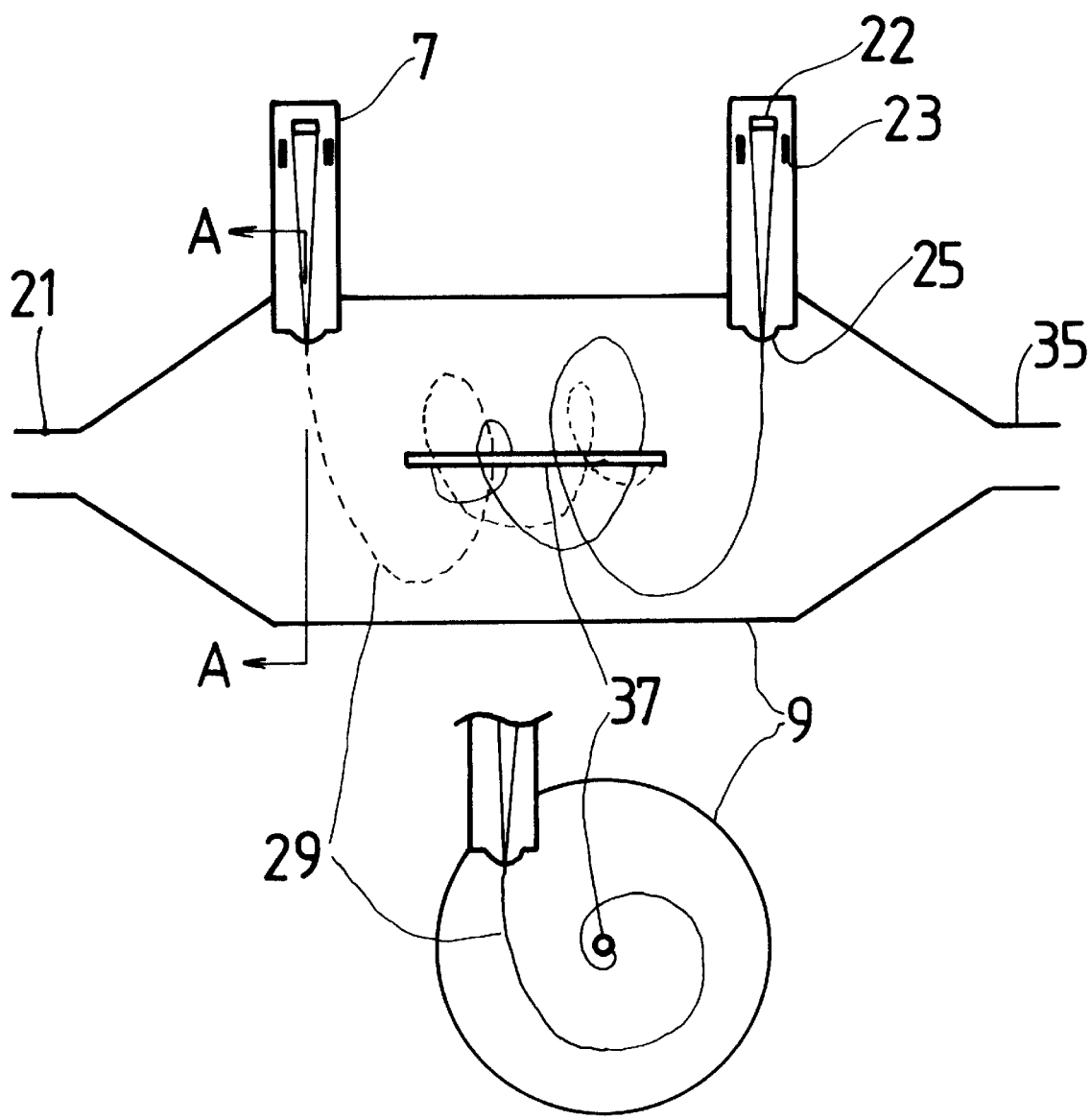
FIG. 3 is a detailed drawing for irradiation duct of the second embodiment of this invention.

For a second embodiment of this invention, the electron beam is introduced through a curved membrane window 25 made of aluminum alloy. The electron beam entrance window is given a 100 kV of potential, it is made of Al alloy, and is 50 μm thick. As the Al is a low atomic number, the X-ray generation is low level and the energy loss in this window is low. This alloy have larger thermal conductivity than Ti or stainless steel, and then the temperature rise is lower than Ti or stainless steel window case. The window can be available a SiC ceramics membrane formed by CVD and have convex shape to the higher pressure side as shown in FIG. 3. The ceramics is weak for tensile stress and strong against compression stress. For the convex shape membrane, only a compression stress is applied, and then very thin membrane can be available and the thermal generation is a little. A compound material between carbon and Al alloy, the carbon and the SiC ceramics and the Al alloy can be available.

The electron beam source 7 have a cathode 22, a convergent electrode 23, form a crossover around the electron beam introduction entrance 25. A typical envelope of the electron beam is shown as 24 in FIG. 3. The electron emitted from the cathode pass through the entrance without collision to the any part in the path, then the energy loss is low and the X-ray generation is low level. At the vicinity of the entrance 25, a permanent magnet which generate a magnetic field that is cross to the electron beam flow direction, is designed and it is better that the electron beam is deflected to the parallel direction to the flow gas direction. For this case the electron beam envelope is deflected as 26 in FIG. 2. A power source 33 for the convergent electrode have a potential of −201 kV, and a power source 34 for the electrode 30 have a potential of 100 kV.

FIG. 3 is an another embodiment for the irradiation duct of this invention. The side view is shown upper and the cross section for A—A is shown below. The irradiation duct 9 is grounded, the cathode 22 in the electron source have a potential of −200 kV, and the electron beam inlet window 25 and, a rod shape electrode 37 in the center of the irradiation duct are applied a potential of 100 kV. The electron is injected from the outer wall of this irradiation duct to the direction between the rod shape electrode and the wall 9.

At the outer part in the irradiation duct, a cylindrical electrode with a −100 kV potential is designed, and at the center part in the irradiation duct, an electrode with a 100 kV potential is designed. For these condition, the electron trajectory 29 is the ideal case where there is no collision with the gas molecule. As there are some collision to the gas molecule for the real case, the real trajectories blur largely around the trajectory 29 and after most of the energy is lost through the collision to the gas molecule, then absorbed to the electrode 37. For this case, even if the irradiation duct is narrow, the electron beam energy is absorbed by the gas molecule sufficiently. After the most of the electron energy have lost, the electron beam is absorbed by the electrode 37 and then high efficiency and low level X-ray generation are expected.

It is cleared from above explanation that for this invention as the electron beam run only the radius distance of the irradiation duct, the small acceleration voltage can be used. The electron beam entrance window and the electron beam collector electrode are given a potential of 100 kV and the cathode is given a −100 kV. These voltage can be generated only electrically and the insulator can be obtained easily.

The electron beam entrance window is the curved surface, then very thin membrane resist against one atmosphere pressure, and then a large beam current with a relatively low beam energy can be used.

The electron beam drift from the outer part to the radial direction in the irradiation duct, a position dependency of the absorption is uniform and the flue gas which pass through in any position is sufficiently reacted and cleaned. Whereas the invention has been described in connection with multiple representative embodiment, it will be understood that the invention is not limited to such embodiments. On the contrary, the invention is intended to encompass all modifications, alternations, and equivalents as may be encompassed by the spirit and scope of the invention, as defined by the appended claims.

Having thus described the invention, what is claimed and described to be secured Letters Patent is as follows:

1. An electron beam apparatus for treatment of boiler system flue gas, comprising:
    an electron beam source having a cathode and a convergent electrode;
    said cathode having an applied negative voltage; an irradiation duct having a flue gas inlet, a treated flue gas outlet, an electron beam introduction entrance and an ammonium introduction entrance;
    said electron beam introduction entrance connected to said electron beam source and receiving an electron beam from said electron beam source;
    and said irradiation duct having at least one electrode with an applied positive voltage.

2. The electron beam treatment apparatus of claim 1, wherein;
    an electric field that deflects the electron beam is introduced into the irradiation duct.

3. The electron beam treatment apparatus of claim 2, wherein;
    the electric field is formed by an electrode around the electron beam entrance, and the electrode have a negative potential.

4. The electron beam treatment apparatus of claim 2, wherein;
    the electric field is formed by an electrode far from the electron beam entrance, and the electrode has a positive voltage.

5. The electron beam treatment apparatus of claim 1, wherein;
    said introduction entrance for the electron beam has a window, and wherein said window is made of low atomic number material.

6. The electron beam treatment apparatus of claim 1, wherein;
    a rod shape electrode is designed in the center of the irradiation duct, and
    the electron is injected from the outer wall of this irradiation duct to the direction between the rod shape electrode and the wall.

7. An electron beam apparatus for treatment of boiler system flue gas, comprising:
    an electron beam source having a cathode and a convergent electrode;
    said cathode having an applied negative voltage; an irradiation duct having a flue gas inlet, a treated flue gas outlet, an electron beam introduction entrance and an ammonium introduction entrance;
    said electron beam introduction entrance connected to said electron beam source and passing an electron beam, from said electron beam source;
    wherein the electron beam source forms a crossover at the electron beam introduction entrance.

8. The electron beam treatment apparatus of claim 7, wherein;

an electric field is formed that deflects the electron beam introduced into the irradiation duct.

9. The electron beam treatment apparatus of claim 7, wherein;

said introduction entrance for the electron beam has a window, and wherein said window is made of low atomic number material.

10. The electron beam treatment apparatus of claim 7, wherein;

a rod shape electrode is designed in the center of the irradiation duct, and the electron is injected from the outer wall of this irradiation duct to the direction between the rod shape electrode and the wall.

11. The electron beam treatment apparatus of claim 9, wherein;

said low atomic number material is an aluminum alloy.

12. An electron beam apparatus for treatment of flue gas, comprising:

an electron beam source having a cathode and a convergent electrode;

said cathode having an applied negative voltage;

an irradiation duct having an electron beam introduction entrance;

said electron beam introduction entrance connected to said electron beam source and passing an electron beam from said electron beam source;

wherein the electron beam source forms a crossover at the electron beam introduction entrance.

13. The electron beam treatment apparatus of claim 12, wherein;

said introduction entrance for the electron beam has a window.

14. The electron beam treatment apparatus of claim 13, wherein;

said window has a positive high voltage.

15. The electron beam treatment apparatus of claim 13, wherein;

said window is a curved surface, whose curvature is concave to the electron source side.

16. The electron beam treatment apparatus of claim 13, wherein;

a negative voltage is applied to the cathode in the electron beam source, and a positive voltage is applied to the window and to the electrode in the irradiation duct.

17. The electron beam treatment apparatus of claim 12, wherein;

an electric field that deflects the electron beam is introduced into the irradiation duct.

18. The electron beam treatment apparatus of claim 12, wherein;

a negative voltage is applied to the cathode in the electron beam source, and a positive voltage is applied to the electrode in the irradiation duct.

19. The electron beam treatment apparatus of claim 12, wherein;

a rod shape electrode is designed in the center of the irradiation duct, and the electron is injected from the outer wall of this irradiation duct to the direction between the rod shape electrode and the wall.

20. A boiler system that has the apparatus of claim 1.

* * * * *